Sept. 27, 1949.                    C. NICOLLE                    2,483,148
                        APPARATUS FOR THE DISTRIBUTION
                             OF PULVERULENT PRODUCTS
                             Filed Aug. 27, 1945
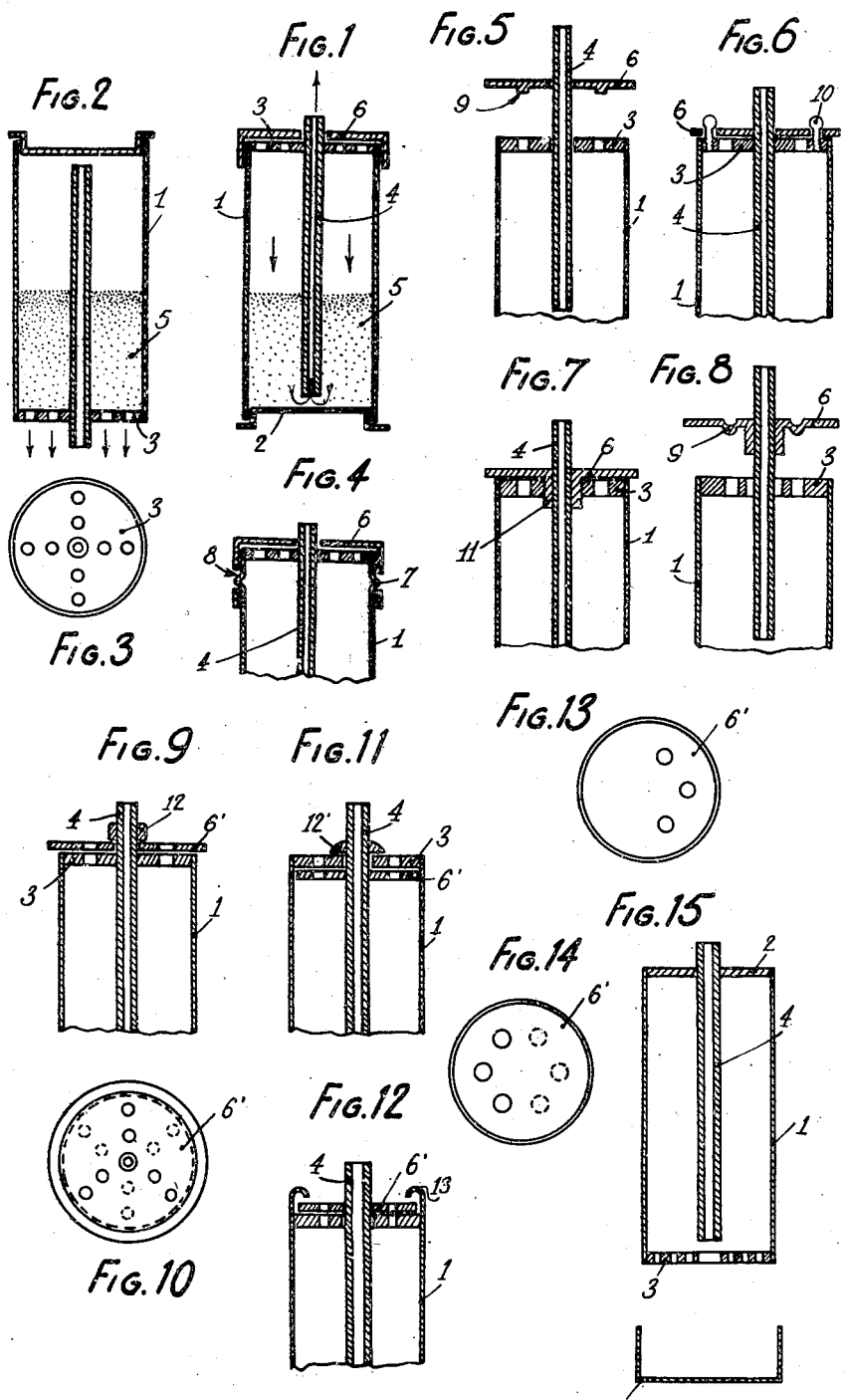

Patented Sept. 27, 1949

2,483,148

UNITED STATES PATENT OFFICE 2,483,148

APPARATUS FOR THE DISTRIBUTION OF PULVERULENT PRODUCTS

Charles Nicolle, Gentilly, France

Application August 27, 1945, Serial No. 612,871
In France December 21, 1944

10 Claims. (Cl. 222—192)

Apparatuses are already known which allow the projection of a succession of jets of a pulverulent product under the effect of the pressure exerted on the sides of the apparatuses, while their removal is performed through tubes engaging said apparatuses.

In particular, apparatuses exist which allow producing rising jets as well as downwardly directed jets.

My present invention has for its object a compound apparatus which is very simple and allows obtaining at will either a projection of pulverulent product under the action of the pressure exerted on the sides of the apparatus or else a mere sprinkling produced through a shaking of the apparatus without any pressure being exerted on its sides.

In the first case I obtain a jet of powder and in the second case something like a cloud extending over a certain surface.

According to a chief characteristic feature of the invention, my apparatus includes a tube dipping inside the receiver containing the pulverulent product whereas either the cover or the bottom of the apparatus is provided with sprinkling ports which may be momentarily closed by suitable means. The apparatus thus constituted forms per se a novel industrial product.

Other advantageous auxiliary features will appear from the reading of the following description and examination of accompanying drawings in which I have shown diagrammatically by way of examples various forms of execution of my invention.

In said drawings:

Figs. 1 and 2 show vertical cross sections of an apparatus executed in accordance with my invention and illustrated respectively in its upright position and in its upside down position.

Fig. 3 is a plan view of one of the perforated covers used in said apparatus.

Fig. 4 shows a modification of the apparatus illustrated in Figs. 1–2 with the means for holding the closing plug.

Fig. 5 is a cross-sectional view of another form of execution of my invention wherein the projecting tube is rigid with the closing means provided for the perforated cover.

Fig. 6 is a modification of the arrangement illustrated in Fig. 5 with bolting means for the shutter.

Figs. 7 and 8 are two modifications of the apparatus illustrated in Fig. 5 showing a special form of shutter associated with the projecting tube.

Fig. 9 is a cross-section of a further form of execution of my invention provided with a rotary shutter.

Fig. 10 is a plan view of the shutter used in the apparatus illustrated in Fig. 9.

Fig. 11 is a modification of the apparatus illustrated in Fig. 9.

Fig. 12 shows a further modification of the apparatus of Fig. 9.

Figs. 13 and 14 are plan views in two different positions of a modified form of the perforated shutter shown in Fig. 10.

Fig. 15 shows a modification wherein the perforated cover is arranged at the lower end of the apparatus.

As apparent from the drawing, in particular in Figs. 1, 2, 3, the apparatus includes a receiver 1 which may for instance have a circular cross-section which may be obtained very economically and very simply by rolling a sheet of plastic material such as acetate of cellulose or the like material. This forms a tube to which is secured on one hand a solid bottom 2 which may at the same time, if required, serve as a filling stopper in which case it is removable and on the other hand a perforated cover or end 3 which carries the tube 4 dipping inside the receiver into the mass of pulverulent material 5 to be projected or dispensed.

On the perforated bottom 3 may be fitted a cover or shutter 6 which is engaged frictionally over the wall of the cylinder 1.

The above described apparatus may serve both for the projecting of an upwardly directed jet of powder or for sprinkling under the form of a cloud having a large surface, according to the result which it is desired to obtain.

For the projection under the form of jets, the apparatus is placed in the position illustrated in Fig. 1 with the shutter 6 in place and a succession of compressions are exerted on the side of the apparatus whereby, the openings in the perforated bottom being closed by the shutter 6, the inner pressure increases and the powder is projected upwardly through the upper end of the tube 4.

When it is desired to use the apparatus for sprinkling, it is only necessary to turn it upside down into the position illustrated in Fig. 2, after which the closing stopper 6 or shutter is removed, and to shake or slightly stir the apparatus. The powder under the action of gravity and of the shocks impressed to said apparatus escapes then through the opening provided in the bottom cover 3 and deposes softly on comparatively large surfaces such as wounds in the case of a pharmaceutical powder, a part of the body in the case of talc, etc.

Consequently it appears that it is possible with an apparatus which is extremely simple and economical in manufacture to execute an apparatus which is adapted to play a double part which may be selected at will: projection of the pulverulent product under a certain pressure on to a suitable well determined point or mere sprinkling of the pulverulent product over a large surface without any pressure being applied.

From the preceding, it appears that a particular form of execution of the double acting apparatus has been described, but other forms of execution of the invention may be imagined and a few of these will be described hereinbelow by way of examples.

In the device illustrated in Fig. 4, which is a modification of that previously described, the closing plug 6 or shutter may be held by means of a bayonet joint obtained by providing for instance at the upper end of the cylinder 1 projecting parts 7 adapted to engage notches 8 provided in the side wall of the closing plug 6, which notches have the shape of an inverted L and may even be replaced by mere holes. Thus, when a succession of pressures is exerted on the side of the apparatus, there is no risk of the plug or shutter rising under the action of this pressure which would lead to a stopping of the operation of the apparatus used for projecting purposes.

In the form of execution illustrated in Fig. 5, the closing cover or shutter 6 is constituted by a simple flat disc rigid with the projecting tube 4. The latter is removable instead of being stationary as in the preceding case and may slide with slight friction inside a suitable hole provided, preferably at its center, in the perforated bottom 3.

For executing the sprinkling, it is simply sufficient to remove the tube 4 with the closing disc 6 carried by it and to turn the apparatus upside down.

For executing the projection of the jet of powder, the tube is set back in place and is forced back until the disc 6 comes into contact with the perforated bottom 3 and the apparatus is then set in its upright position illustrated in Fig. 5.

If desired, it is possible to provide as shown on the closing disc 6 a plurality of small bosses or projections 9 the location of which corresponds to the location of the holes in the perforated bottom 3.

The bosses engage said holes when the shutter 6 is caused to bear against the perforated cover 3 so as to provide for a more fluidtight closure of the apparatus when it is used for projecting a jet of powder through the tube 4.

The small bosses 9 may be obtained in any suitable manner; they may be chased, stamped, cast, etc.

In the form of execution illustrated in Fig. 6, there is used also a closing disc 6 which is rigid with the projecting tube 4 and in this form of execution, there is provided a system for interengagement 10 including a bayonet joint for the shutter 6 with reference to the perforated cover 3 to the same purpose as that disclosed in the case of Fig. 4.

For the same purpose also, another solution may be proposed which consists as illustrated in Fig. 7 in providing the shutter 6 with a central threaded projection 11 which may be screwed inside a tapped hole which corresponds thereto in the perforated cover 3.

In a modification illustrated in Fig. 8, the same arrangement is provided for ensuring the fluidtightness of the receiver 1, but it is associated with projections 9 provided as in the case of Fig. 5 on the lower surface of the shutter 6 so as to correspond with the openings in the perforated bottom 3.

In the form of execution of Fig. 9, the projection tube 4 is welded to the perforated cover 3 as in the case illustrated in Figs. 1 and 2, but the closing of the openings in said perforated cover is obtained through a rotation of the closing disc or shutter 6' which is retained against the bottom cover by a stationary ring 12.

In the form of execution illustrated in particular in Figs. 5 to 9, it is of advantage to give the disc shaped shutter a diameter which is preferably slightly greater than the diameter of the neck of the receiver 1 so as to further the operation of this closing shutter which should never be too loose, without operation becoming however too hard.

The edges of the shutter may be indented or provided with flat sides to make operation easy.

In the plan view shown in Fig. 10, the apparatus is closed as the perforations in the closing disc do not register any more with openings in the perforated bottom 3. This corresponds to the use of the apparatus in its upright position for the projection of the jet of powder through the tube 4. When it is to be used for sprinkling, it is sufficient to make the disc 6 rotate in order to bring said openings into register and to turn the apparatus upside down.

In Fig. 11, I have illustrated a modification of the device shown in Fig. 9. According to this modification, the perforated shutter or disc 6' is arranged on the inside and the tube 4 is carried by the perforated cover or bottom 3 so that it may rotate therein and carry along with it the closing disc 6 which is rigid therewith. The tube 4 with the perforated closing disc 6' is held and prevented from moving longitudinally by a ring 12'.

The operation of the apparatus is similar to that disclosed with reference to Fig. 9.

In Fig. 12, I have illustrated a further modification of the apparatus according to Fig. 9, said modification consisting in that the perforated shutter disc 6' is again located on the outside, but in the case of Fig. 12 it is rigid with the projecting tube 4. This arrangement is held by means for instance of a fitting 13 provided on the neck of the receiver 1.

In these various forms of execution it is of advantage to provide also in the perforated disc 6', small bosses or projections similar to the projections 9 illustrated in Figs. 5 and 8, which projections engage in their closing position the holes of the perforated bottom 3.

In Figs. 13 and 14, I have shown a plan view of perforated shutters or discs 6' which may be mounted according to any of the above described systems, but wherein the arrangement of the perforations differs and allows an adjustment of the sprinkling output. The perforations of the shutter 6' are arranged as in the case of the perforations in the bottom or cover 3 along one or more half circles so that when the shutter or disc 6' is caused to rotate, a more or less considerable number of ports is brought in front of corresponding ports, which has for its result an increase as desired of the sprinkling output.

In the position illustrated in Fig. 14, the receiver is closed and no sprinkling can be executed; this is the position which corresponds to the projection through the upright standing apparatus of a jet of powder through the tube 4.

In the position of Fig. 13, on the contrary, the perforated bottom is open to a maximum so as to sprinkle through the registering ports; in other words, this position corresponds to the maximum output of sprinkling material.

Between these two positions, there exists a certain number of intermediary positions corresponding to intermediary outputs between zero and this maximum.

In Fig. 15, I have shown another form of execution of my invention which allows the same results to be obtained as those obtained in the preceding cases, but without it being necessary to turn the apparatus upside down. In this form of execution the projecting tube 4 instead of being mounted in the perforated bottom 3 is carried on the opposite solid cover 2. The perforated bottom 3 may be closed in any suitable manner, for instance by means of a closing plug 6 such as that used in the form of execution of Figs. 1 and 2.

Any other closing means and in particular any of the other precedingly disclosed forms of execution and their modifications may be applied.

In the various preceding forms of execution, the perforated bottom 3 has been shown as provided with a certain number of holes.

If desired, in certain cases one hole only could be provided for sprinkling purposes. This hole is used at the same time for passing projection tube 4 therethrough and said tube may be held in place either by frictional engagement with the wall of the hole, or by means of a threaded portion of the tube engaging a hollow thread provided in said hole.

This would lead in the same manner as previously described and according to my invention to an apparatus affording means for executing an upwardly directed projection of pulverulent product on one hand and a gradual steady sprinkling on the other hand.

Of course, the arrangement and size of the perforations, as well as the diameter of the projecting tube 4 are chosen in accordance with the nature of the powder and the output to be obtained.

In the above disclosure, I have described a receiver wherein the body of the receiver is formed by a cylinder obtained by rolling a sheet of plastic material. Obviously the body of the apparatus may receive any other suitable shape and may be obtained through any other means. For instance I may obtain this body of the apparatus by sticking or coupling through their edges two suitably recessed sheets of plastic material.

Lastly it is possible to modify, without widening the scope of my invention, certain details in the execution of the apparatuses described and illustrated, which have been shown merely by way of examples. These apparatuses allow on one hand a projection under pressure of a succession of jets of pulverulent products under the action of pressure exerted on the walls of the apparatus and on the other hand a sprinkling of these same products through a free downward fall which distributes them as desired.

What I claim is:

1. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a closure rigidly secured to the projection tube and forming therewith a unit adapted to move axially with reference to the walls and perforated cover.

2. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc adapted to rotate coaxially with reference to and in contact with the perforated cover, round the projection tube, so as to allow its perforations to be brought into and out of register with those of said perforated cover.

3. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc rigidly secured to the projection tube and forming therewith a unit adapted to rotate round a longitudinal axis of the receiver so as to allow the perforations in the perforated disc and cover to be brought into and out of register.

4. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc adapted to rotate coaxially with reference to and in contact with the perforated cover, on the inside of the receiver, so as to allow its perforations to be brought into and out of register with those of said perforated cover.

5. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc adapted to rotate coaxially with reference to and in contact with the perforated cover on the outside of the receiver, so as to allow its perforations to be brought into and out of register with those of said perforated cover.

6. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover, a plug adapted to removably cap the perforated cover, and bayonet bolting means for securing the plug to the receiver.

7. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover, a rotary closing disc rigid with the projection tube and forming therewith a unit adapted to move with reference to the perforated cover and bayonet bolting means on said disc for securing same to the perforated cover.

8. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a closure rigid with the projection tube and including an element adapted to be screwed inside the perforated cover.

9. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc adapted to rotate coaxially with reference to and in contact with the perforated cover, the number of perforations registering with one another on the disc and on the cover varying with the angular position of the disc.

10. An apparatus for the distribution of pulverulent products constituted by a receiver comprising slightly elastic walls, a perforated cover at one end of said receiver, a projection tube dipping inside said receiver up to a predetermined distance from the bottom of said receiver and passing through the perforated cover and a perforated disc adapted to rotate coaxially with reference to and in contact with the perforated cover, the perforations on the disc and on the cover being arranged along arcs of a circle of equal radii and at equal distances from one another.

CHARLES NICOLLE.

REFERENCES CITED

The following references are of record in the file of this patent:

UNITED STATES PATENTS

| Number | Name | Date |
| --- | --- | --- |
| 1,959,874 | Mills | May 22, 1934 |
| 2,116,714 | Rose | May 10, 1938 |